(12) United States Patent
Xu et al.

(10) Patent No.: US 12,317,245 B2
(45) Date of Patent: May 27, 2025

(54) BEAM FAILURE MANAGEMENT FOR USER EQUIPMENT OUT OF SYNCHRONIZATION IN THE UPLINK

(71) Applicant: Apple Inc., Cupertino, CA (US)

(72) Inventors: Fangli Xu, Beijing (CN); Chunhai Yao, Beijing (CN); Clive E. Rodgers, Palo Alto, CA (US); Dawei Zhang, Saratoga, CA (US); Haijng Hu, Los Gatos, CA (US); Haitong Sun, Cupertino, CA (US); Wei Zeng, Saratoga, CA (US); Yuqin Chen, Beijing (CN); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 336 days.

(21) Appl. No.: 17/755,335

(22) PCT Filed: Nov. 4, 2019

(86) PCT No.: PCT/CN2019/115251
§ 371 (c)(1),
(2) Date: Apr. 27, 2022

(87) PCT Pub. No.: WO2021/087642
PCT Pub. Date: May 14, 2021

(65) Prior Publication Data
US 2022/0386294 A1    Dec. 1, 2022

(51) Int. Cl.
*H04W 24/08* (2009.01)
*H04W 56/00* (2009.01)
(Continued)

(52) U.S. Cl.
CPC ......... *H04W 72/046* (2013.01); *H04W 24/08* (2013.01); *H04W 56/0015* (2013.01); *H04W 74/0833* (2013.01)

(58) Field of Classification Search
CPC ......... H04W 56/0045; H04W 74/0833; H04W 24/08; H04W 56/0005; H04W 72/046; H04W 56/0015; H04B 7/0695
See application file for complete search history.

(56) References Cited

U.S. PATENT DOCUMENTS 10,660,063 B2 * 5/2020 Park ..................... H04W 68/005
11,337,265 B2 * 5/2022 Zhou .................... H04B 7/0695
(Continued)

FOREIGN PATENT DOCUMENTS

CN    109565753    4/2019
CN    109963337    7/2019
(Continued)

OTHER PUBLICATIONS

Nokia et al., "CFRA resource handling for BFR upon TAT expiry" 3GPP TSG-RAN WG2 Meeting #107bis, R2-1913226, Oct. 18, 2019, 6 sheets.
(Continued)

*Primary Examiner* — Syed Ali
(74) *Attorney, Agent, or Firm* — Fay Kaplun & Marcin, LLP (57) ABSTRACT

Devices, systems and methods for implementing beam failure management techniques at a user equipment (UE). The UE receives a timing advance command (TAC) from a currently camped cell and initiates a time advance timer (TAT). When the TAT is running the UE is in a first operating state. The first operating state indicates that the UE is in time alignment with the cell. The UE identifies that the TAT has expired. When the TAT is not running the UE is in a second operating state. The second operating state indicates that the UE is not in time alignment with the cell. The UE implements one or more beam failure management techniques based on the UE operating in the second operating state.

17 Claims, 7 Drawing Sheets

(51) Int. Cl.
*H04W 72/044* (2023.01)
*H04W 74/0833* (2024.01)

(56) References Cited

U.S. PATENT DOCUMENTS

| | | | | |
|---|---|---|---|---|
| 2019/0306867 A1* | 10/2019 | Cirik | ................ | H04W 36/0005 |
| 2020/0100299 A1* | 3/2020 | Loehr | ................ | H04W 72/0446 |
| 2020/0106573 A1* | 4/2020 | Cirik | ................ | H04W 74/0808 |
| 2020/0351801 A1* | 11/2020 | Jeon | ...................... | H04W 52/48 |
| 2021/0168874 A1* | 6/2021 | Wei | ................... | H04W 74/0833 |
| 2022/0110166 A1* | 4/2022 | Koskela | ............... | H04B 7/0695 |
| 2022/0386294 A1* | 12/2022 | Xu | .................... | H04W 56/0045 |

FOREIGN PATENT DOCUMENTS

| | | |
|---|---|---|
| CN | 110213819 | 9/2019 |
| EP | 3537835 | 9/2019 |
| WO | 2018/170742 | 9/2018 |
| WO | 2019/032997 | 2/2019 |

OTHER PUBLICATIONS

Apple et al., "BFR handling upon TAT expiry", 3GPP TSG-RAN WG2 Meeting #103bis, R2- 1815008, Oct. 12, 2018, 5 sheets.

* cited by examiner

BEAM FAILURE MANAGEMENT FOR USER EQUIPMENT OUT OF SYNCHRONIZATION IN THE UPLINK

BACKGROUND

A user equipment (UE) may establish a connection to at least one of multiple different networks or types of networks. To establish the connection and perform the full scope of functionalities normally available to the UE via the network connection, the UE may camp on a cell of a corresponding network. To maintain time alignment between the UE and the cell in the uplink, the UE may be equipped with a time alignment timer (TAT). When the TAT is running, the UE is considered to have uplink synchronization with the network. When the TAT is not running, the UE is considered to be out of synchronization (OOS). When the UE is OOS in the uplink, the uplink capabilities of the UE are limited.

In some networks, downlink communications may utilize a beam. For any of a variety of different reasons, the quality and/or performance of a serving beam may be inadequate and beam failure may be declared. In response, the UE may initiate a beam failure recovery (BFR) procedure. The BFR procedure may include sending a signal to the network that may assist the cell in selecting a different beam to use for subsequent downlink communications.

Under conventional circumstances, when the UE is in the uplink OOS state, the UE may still be configured to perform beam failure detection (BFD) and BFR procedures. However, as indicated above, the uplink capabilities of the UE are limited when the UE is the uplink OOS state. As a result, the UE may not be able to successfully complete the BFR procedure because the UE may not be able to perform the appropriate uplink signaling. Accordingly, when the UE is in the uplink OOS state, conventional BFD and BFR procedures are an inefficient use of both UE and network resources.

SUMMARY

The exemplary embodiments include a method performed by a user equipment (UE). The method includes receiving a timing advance command (TAC) from a currently camped cell. The method further includes initiating a time advance timer (TAT). When the TAT is running the UE is in a first operating state, wherein the first operating state indicates that the UE is in time alignment with the cell. The method further includes identifying that the TAT has expired. When the TAT is not running the UE is in a second operating state, wherein the second operating state indicates that the UE is not in time alignment with the cell. The method further includes implementing one or more beam failure management techniques based on the UE operating in the second operating state.

Further exemplary embodiments include a UE having a transceiver configured to establish a network connection and a processor configured to perform operations. The operations comprising receiving a timing advance command (TAC) from a currently camped cell. The operations further comprising, initiating a time advance timer (TAT). When the TAT is running the UE is in a first operating state, wherein the first operating state indicates that the UE is in time alignment with the cell. The operations further comprising, identifying that the TAT has expired. When the TAT is not running the UE is in a second operating state, wherein the second operating state indicates that the UE is not in time alignment with the cell. The operations further comprising implementing one or more beam failure management techniques based on the UE being in the second operating state.

Further exemplary embodiments include an integrated circuit including circuitry configured to receive a timing advance command (TAC) from a currently camped cell. Circuitry configured to initiate a time advance timer (TAT). When the TAT is running the UE is in a first operating state, wherein the first operating state indicates that the UE is in time alignment with the cell. Circuitry configured to identify that the TAT has expired. When the TAT is not running the UE is in a second operating state, wherein the second operating state indicates that the UE is not in time alignment with the cell. Circuitry configured to implement one or more beam failure management techniques based on the UE operating in the second operating state.

DETAILED DESCRIPTION

The exemplary embodiments may be further understood with reference to the following description and the related appended drawings, wherein like elements are provided with the same reference numerals. The exemplary embodiments describe devices, systems and methods for improving beam failure management at a user equipment (UE) operating in an out-of-synchronization (OOS) state with regard to uplink communications.

The exemplary embodiments are described with regard to the UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a cell being a next generation Node B (gNB) and the corresponding network being a 5G New Radio (NR) network. However, any reference to the gNB and the 5G NR network are merely provided for illustrative purposes. The exemplary embodiments may apply to any device that is configured to transmit a beam to a UE.

Throughout this description the UE will be described with regard to two different uplink synchronization states. Generally, these synchronization states relate to uplink transmission timing. The term "in-sync" may refer to an operating state in which the UE is in time alignment with the network in the uplink and the UE is permitted to use certain uplink resources, e.g., physical uplink control channel (PUCCH), physical uplink shared channel (PUSCH), sounding reference signal (SRS), etc. The term out-of-sync (OOS) may refer to an operating state in which the UE does not possess time alignment with the network in the uplink and the uplink resources available to the UE are limited. Those skilled in the art would understand the scope of uplink resources available to the UE when operating in the in-sync state and the scope of uplink resources available to the UE when operating in the OOS state.

From the perspective of the UE, uplink synchronization state maintenance is driven by a time alignment timer (TAT). When the TAT is running, the UE may be considered to be in-sync. When the TAT is not running the UE may be considered to be OOS. Throughout this description, the TAT may be described as being managed by the medium access control (MAC) layer, however, this is only provided for illustrative purposes and the UE may manage the TAT in any appropriate manner.

To provide a general example of how the TAT is managed by the UE, consider the following exemplary scenario in which the UE is currently camped on a cell of the network. Initially, the UE may transmit a signal to the cell via a random access channel (RACH). The cell may then determine how the UE is to adjust its uplink transmission timing. This information may be transmitted by the cell to the UE as a timing advance command (TAC).

The UE may initiate the TAT based on receiving the TAC. As mentioned above, when the TAT is running the UE is considered to be in-sync. The duration of the TAT may represent the amount of time the UE may assume the UE is in time alignment with the network. When the UE is in time alignment, the UE is permitted to use certain uplink resources such as the PUCCH, the PUSCH and SRSs.

When the TAT expires, time alignment may be considered to be lost and thus, the UE is in an OOS state. When the UE is OOS, the UE is not permitted to use certain uplink resources, e.g., PUCCH, the PUSCH and SRSs. Further, when the UE transitions to the OOS state, the UE may release configuration information relevant to the in-sync state. For example, if the UE was assigned any of the above reference uplink resources prior to entering the OOS state, the UE may be configured to release these dedicated uplink resources upon the expiration of the TAT. However, the UE may still transmit a signal over the random access channel (RACH) to initiate re-alignment with the network. Any reference to a particular uplink resource being available to the UE operating in the in-sync state and the UE operating in the OOS state are merely provided for illustrative purposes. Those skilled in the art would understand the scope of uplink resources available to the UE when operating in the in-sync state and the scope of uplink resources available to the UE when operating in the OOS state.

When the UE is the OOS state, the UE can transition to the in-sync state by performing a RACH procedure to acquire a TAC from the network. However, in certain scenarios, the network may send a TAC to the UE without being prompted by the UE. Thus, the UE may re-enter the in-sync state based on receiving the TAC regardless of whether a RACH procedure is performed. The above exemplary scenario is only provided for illustrative purposes and is not intended to limit the exemplary embodiments in any way. Different networks and entities may refer to concepts and mechanisms similar to the ones mentioned above by different names.

The exemplary embodiments are also described with regard to beam failure management. Beam failure management may encompass beam failure detection (BFD) and beam failure recovery (BFR) procedures. BFD generally relates to determining that a serving beam is not providing adequate quality and/or performance in the downlink. BFR generally relates to assisting the network with scheduling subsequent downlink communications using a different beam that is likely to provide adequate quality and/or performance in the downlink. Therefore, beam failure management may include the UE collecting measurement data corresponding to multiple beams (e.g., serving beams, candidate beams, etc.) and subsequently transmitting information to the currently camped cell.

Under conventional circumstances, when the UE is in the OOS state, the UE is configured to perform BFD and BFR procedures. However, the UE is unable to deliver beam failure management related information to the cell because the uplink resources available when the UE is in the OOS state are limited. As a result, performing operations related to conventional BFD and BFR procedures when the UE is in the OOS state may cause the UE to experience an unnecessary power drain because without being able to use certain uplink resources the UE cannot successfully complete the BFR procedure. Further, in this scenario, uplink resources may be reserved by the network for a UE that is in an operating state that prevents the UE from actually using these uplink resources. Accordingly, when the UE is in the OOS state, conventional BFD and BFR procedures are an inefficient use of both UE and network resources.

The exemplary embodiments relate to beam failure management techniques that are to be implemented when the UE is in the OOS state. As will be shown below, these exemplary techniques provide power saving benefits to the UE and allow the network to more efficiently allocate uplink resources. These exemplary techniques may be used in conjunction with currently implemented beam failure management mechanisms, future implementations of beam failure management mechanisms or independently from other beam failure management mechanisms. The exemplary embodiments may apply to scenario where the UE is in the OOS state.

Figure 1:
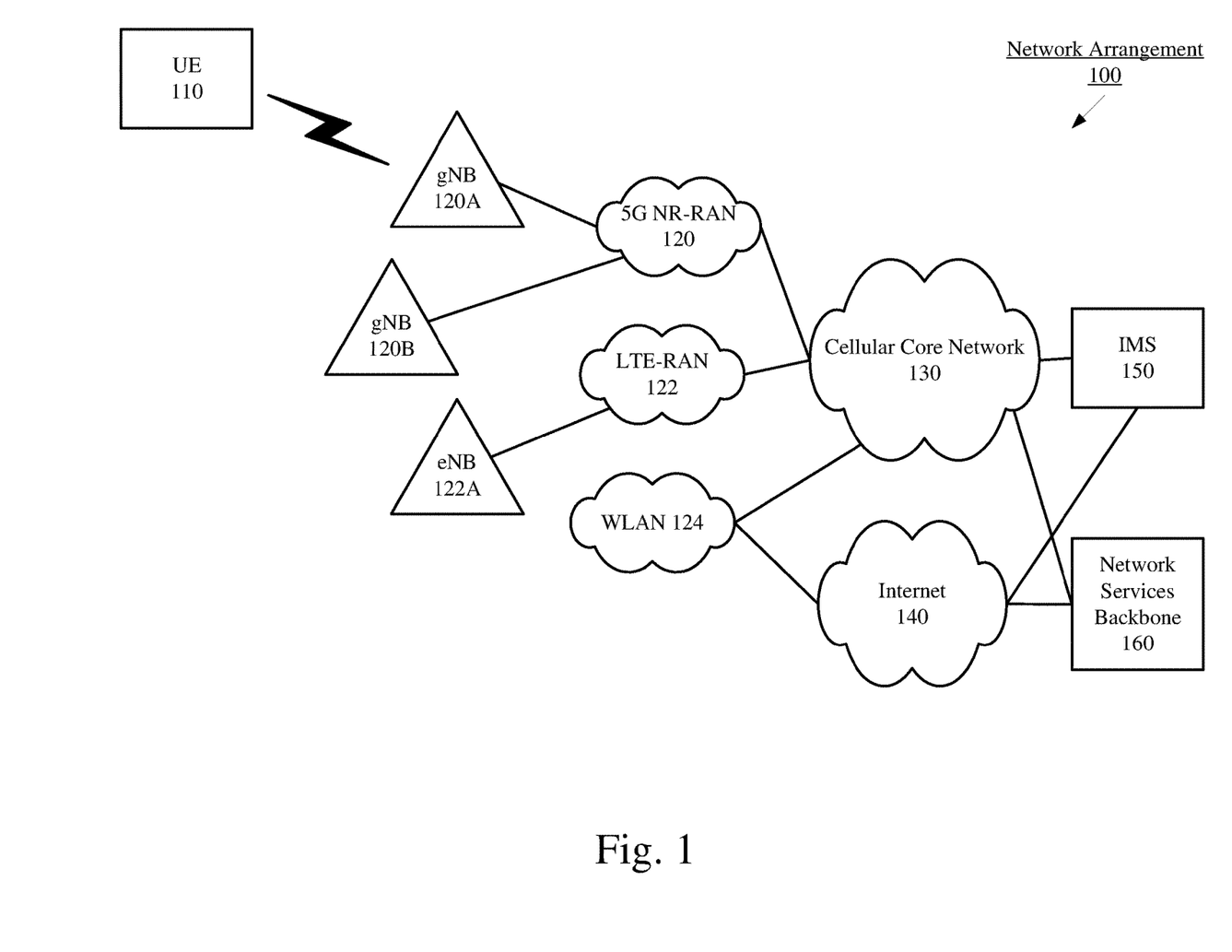
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, a LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBS, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via the gNB 120A. As mentioned above, the exemplary embodiments are related to using beams in the downlink. Accordingly, the gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
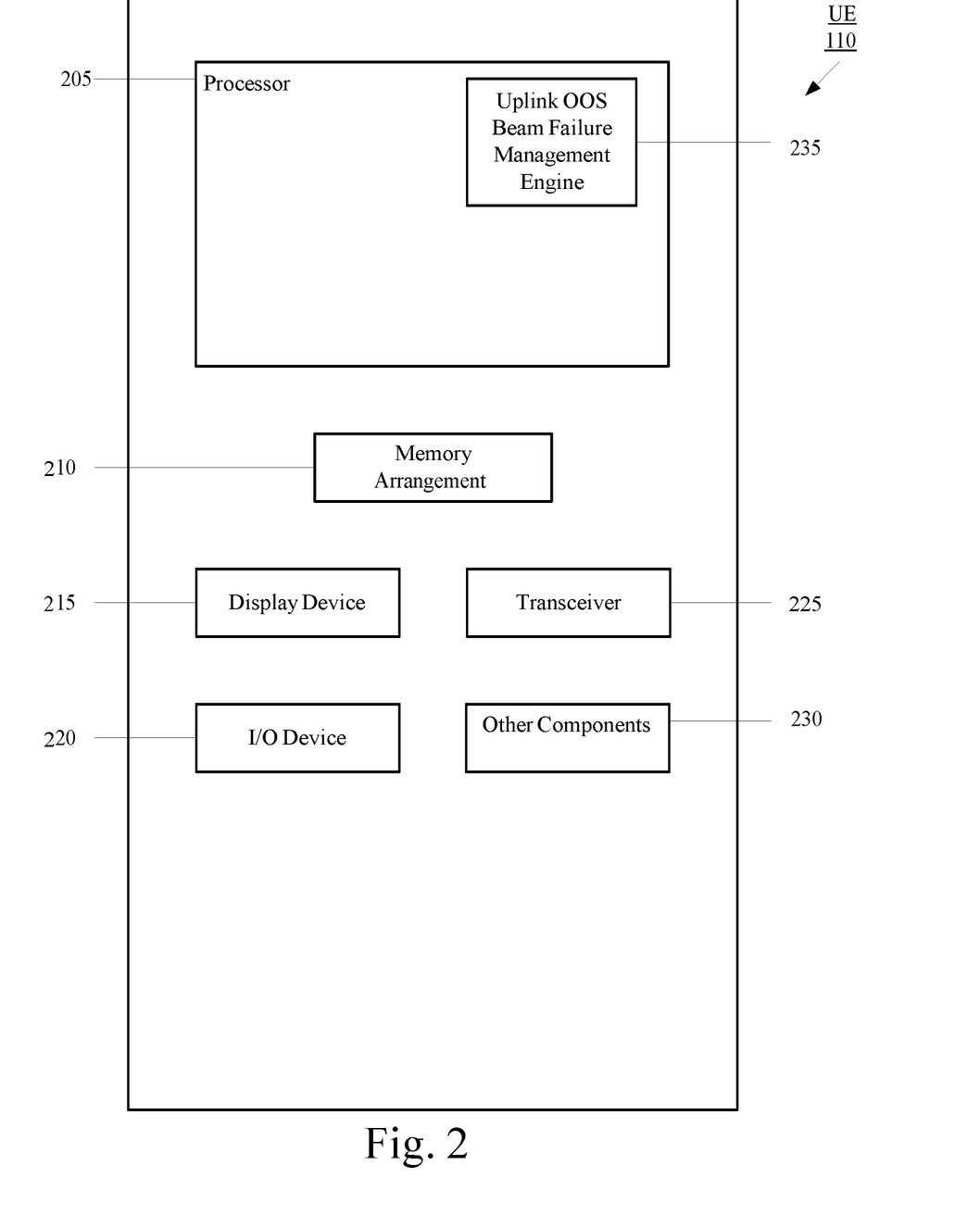
FIG. 2 shows an exemplary UE according to various exemplary embodiments.

FIG. 2 shows an exemplary UE 110 according to various exemplary embodiments. The UE 110 will be described with regard to the network arrangement 100 of FIG. 2. The UE 110 may represent any electronic device and may include a processor 205, a memory arrangement 210, a display device 215, an input/output (I/O) device 220, a transceiver 225, an antenna panel 230 and other components 235. The other components 235 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include an uplink OOS beam failure management engine 235. The uplink OOS beam failure management engine 235 may determine which exemplary beam failure management technique is to be implemented when the UE is in the OOS state and manage the corresponding operations.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
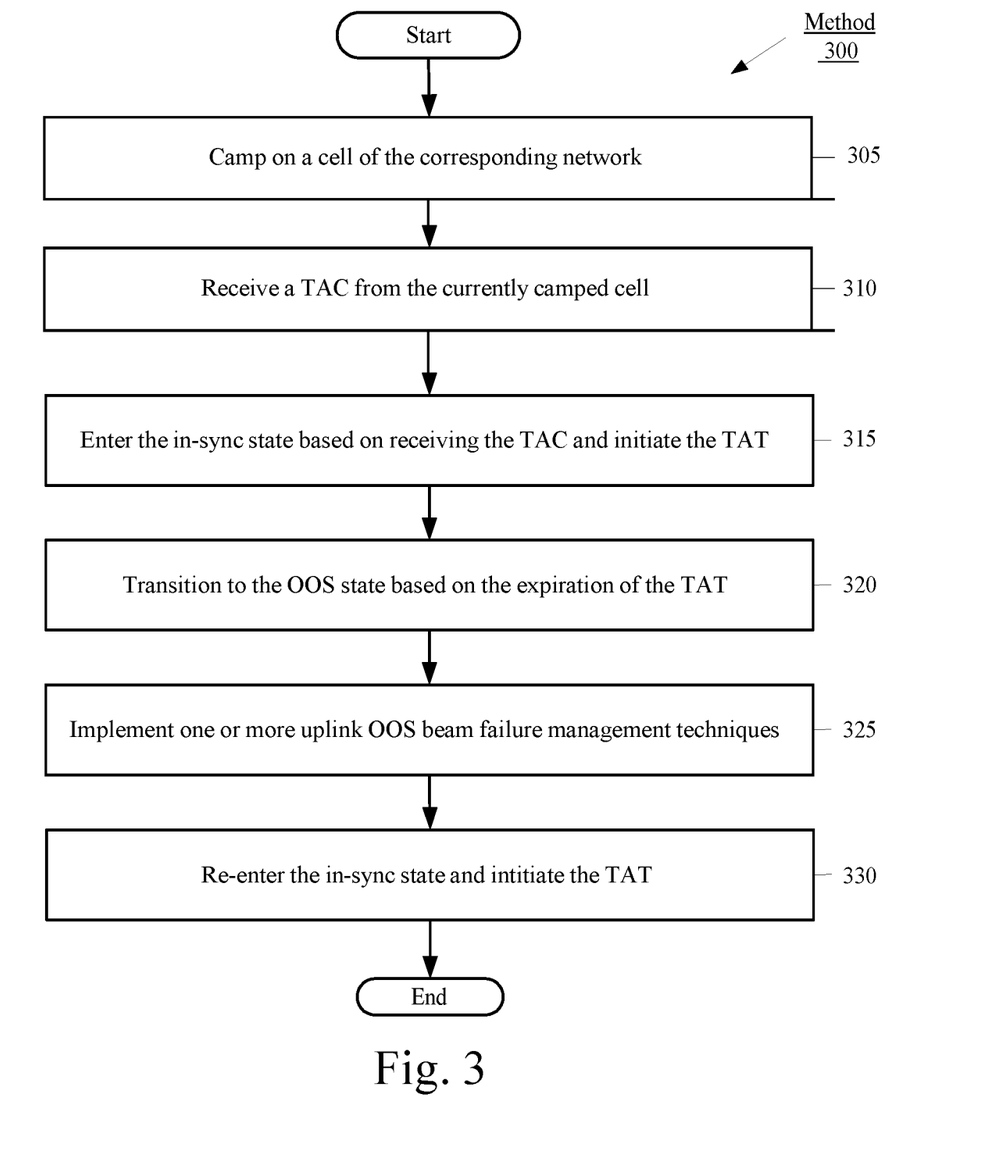
FIG. 3 shows a method for implementing uplink OOS beam failure management techniques according to various exemplary embodiments.

FIG. 3 shows a method 300 for implementing uplink OOS beam failure management techniques according to various exemplary embodiments. The method 300 is described with regard to the network arrangement 100 of FIG. 1 and the UE 110 of FIG. 2.

In 305, the UE 110 camps on a cell of the network. For example, the UE 110 may camp on the gNB 120A of the 5G NR-RAN 120.

In 310, the UE 110 receives a TAC from the currently camped cell. In some scenarios, the TAC may be received as part of the RACH procedure. For example, the UE 110 may transmit a RACH preamble to the cell and in response, the UE 110 may receive a random access (RA) response (RAR) which may include the TAC. In other scenarios, the TAC may be received in a TAC MAC CE. The TAC may include timing information (e.g., timing advance value) based on measurements performed by the cell corresponding to communications with the UE 110. The exemplary embodiments are not limited to determining the timing information in any particular manner, those skilled in the art would understand how the cell may determine contents of the timing information.

In 315, the UE 110 enters the in-sync state based on receiving the TAC and initiates the TAT. As mentioned above, in-sync refers to an operating state in which the UE is in time alignment with the network in the uplink and the UE is permitted to use certain uplink resources, e.g., PUCCH, PUSCH, SRSs, etc. From the UE 110 perspective, the UE 110 is considered to be in-sync when the TAT is running. Thus, transitioning to the in-sync state may include initiating the TAT. The duration of the TAT (or a threshold value that may be used to indicate the TAT has expired), represents how long the UE 110 may assume that the UE 110 is in time alignment with the network. The duration of the TAT is not based on the timing information. That is, the timing information is applied to uplink transmission timing and the TAT is used for operating state maintenance. The exemplary embodiments are not limited to determining the duration of the TAT in any particular manner, those skilled in the art would understand how the duration of the TAT may be determined.

When the UE 110 is in the in-sync state, the cell may transmit a further TAC to the UE 110. The cell may periodically transmit TACs or may be triggered to transmit a TAC to the UE 110 based on the occurrence of a predetermined condition. When a UE 110 is in the in-sync state and receives a TAC, the TAT timer may be reset to its initial value.

In 320, the UE 110 transitions to the OOS state based on the expiration of the TAT. As mentioned above, OOS refers to an operating state in which the UE 110 is not in time alignment with the cell. Further, the UE 110 is no longer permitted to use various uplink resources, e.g., PUCCH, PUSCH, SRS, etc. As a result, the UE 110 is unable to perform various types of uplink communications. However, the UE 110 may send signals such as a RACH preamble to the currently camped cell in an attempt to re-enter the in-sync state.

In 325, the UE 110 implements one or more uplink OOS beam failure management techniques. One exemplary technique may include suspending the BFD procedure while the UE 110 is in the OOS state. This technique is described in detail below with regard to FIG. 5. Another exemplary technique may include suspending the BFR procedure while the UE 110 is in the OOS state. This technique is described in detail below with regard to FIG. 6. A further exemplary technique may relate to UE 110 operation when BFR procedure and data triggered random access (RA) procedure collide while the UE 110 is in the OOS state. This technique is described in detail below with regard to FIGS. 7a-7b. A further exemplary technique relates to the UE 110 monitoring the PDCCH while the UE 110 is in the OOS state. Another exemplary technique relates to the UE 110 performing an RA procedure while the UE 110 is in the OOS state. These techniques will also be described in more detail below.

In 330, the UE 110 re-enters the in-sync state and initiates the TAT. This transition may be triggered based on the UE 110 receiving a TAC from the network. As mentioned above, the TAC may be sent periodically or based on the occurrence of a predetermined condition. However, any reference to the UE 110 being sent a TAC for any particular reason is only provided for illustrative purposes. The exemplary embodiments may apply to reception of the TAC for any appropriate reason.

Figure 4A:
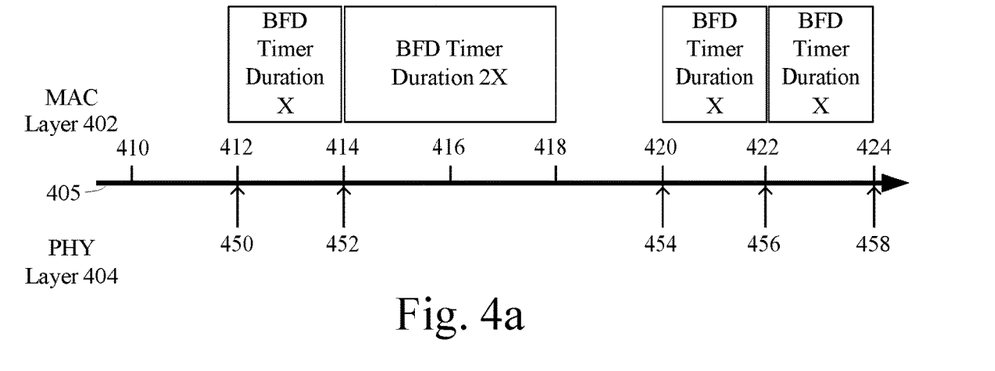
FIGS. 4a-4c show BFD and BFR procedures for a UE operating in the in-sync state according to exemplary embodiments.
Figure 4B:
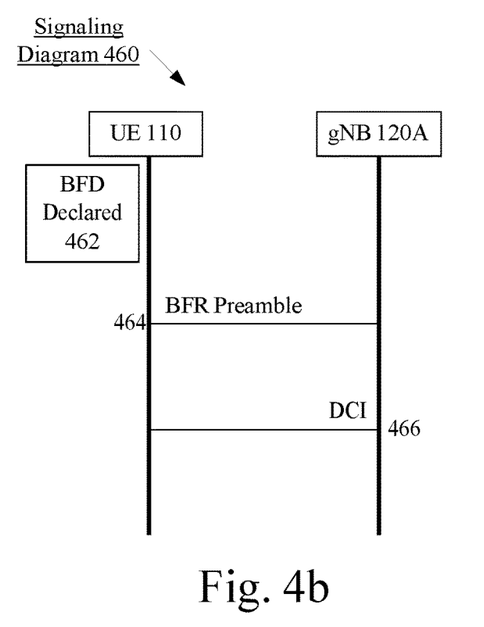
Figure 4C:
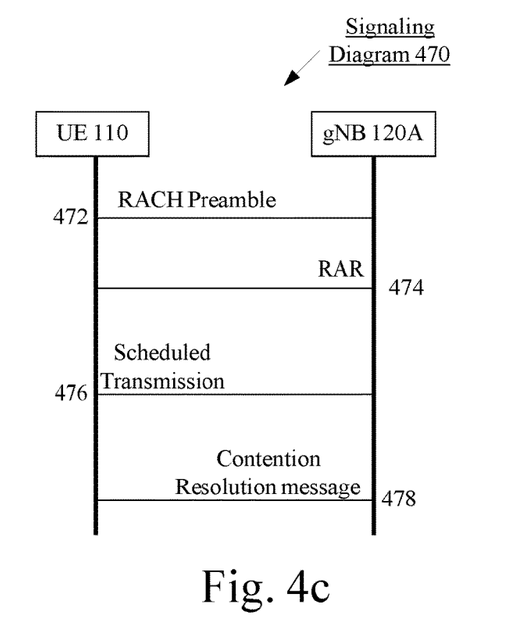

FIGS. 4a-4c show BFD and BFR procedures for a UE 110 operating in the in-sync state according to exemplary embodiments. These examples are merely intended to represent general examples of how the UE 110 may perform BFD and BFR procedures when the UE 110 is operating in the in-sync state. These examples may also demonstrate the benefits of the exemplary uplink OOS techniques described below in FIGS. 5-9. FIGS. 4a-4c are described with regard to the network arrangement 100 of FIG. 1 and the UE 110 of FIG. 2.

FIG. 4a relates to the performance of the BFD procedure from the perspective of the MAC layer 402. During operation, if the physical (PHY) layer 404 identifies a predetermined condition related to a serving beam, the PHY layer 404 may provide the MAC layer 402 with a beam failure instance (BFI) indication. The BFI indication may represent that a quality and/or performance issues related to a serving beam has been identified. The exemplary embodiments are not limited to generating a BFI instance on any particular basis.

The MAC layer 402 may be configured to monitor for BFI indications periodically. These monitoring occasions may be referred to as beam failure evaluation instances and are represented by points 410-424 of the timeline 405.

The BFD procedure utilizes a BFD timer and a BFD counter. During operations, when a BFI indication is received at the MAC layer 402 the value of the BFD counter is increased, and the BFD timer is reset to its initial value. As will be shown below, if the timer expires before the BFD counter satisfies a predetermined threshold, the BFD counter is reset. When the BFD counter satisfies a predetermined threshold, BFD is declared.

In this example, points 410-424 on the timeline 405 each represent a beam failure evaluation instance separated by a duration (x). The BFD timer is configured to expire at 2X and the BFD counter threshold is set to three BFI indications. This example is only provided to demonstrate how the BFD timer and the BFD counter may be managed by the MAC layer 402 and is not intended to limit how the UE 110 may perform BFD and BFR procedures when the UE 110 is in the in-sync state.

At evaluation instance 410, the MAC layer 402 does not receive a BFI indication. At evaluation instance 412, the MAC layer 402 receives a first BFI indication 450. In response to the first BFI indication 450, the BFD timer is initiated, and the BFD counter is increased from 0 to 1. Since the BFD counter has not reached the threshold value of 3, BFD is not declared.

At evaluation instance 414, the MAC layer 402 receives a second BFI indication 452. In response to the second BFI indication 452, the BFD counter is increased from 1 to 2 and the BFD timer is reset. Since the BFD counter has not reached the threshold value of 3, BFD is not declared.

At evaluation instance 416, the MAC layer 402 does not receive a BFI indication and the BFD timer continues to run. At evaluation instance 418, the MAC layer 402 does not receive a BFI indication. Since the BFD timer has been running for 2X at evaluation instance 418, the timer has expired without the BFD counter reaching the threshold value of 3. Therefore, the BFD counter is reset from 2 to 0.

At evaluation instance 420, the MAC layer 402 receives a third BFI indication 454. In response to the third BFI indication 454, the BFD counter is increased from 0 to 1 and the BFD timer is initiated. Since the BFD counter has not reached the threshold value of 3, BFD is not declared. At evaluation instance 422, the MAC layer 402 receives a fourth BFI indication. In response to the fourth BFI indication 456, the BFD counter is increased from 1 to 2 and the BFD timer is reset. Since the BFD counter has not reached the threshold value of 3, BFD is not declared. At evaluation instance 424, the MAC layer 402 receives a fifth BFI indication 408. In response to the fifth BFI indication 408, the BFD counter is increased from 2 to 3 and the BFD timer is reset. Since the BFD counter has reached the threshold value of 3, BFD is declared.

When BFD is declared, a BFR procedure may be triggered. As mentioned above, a BFR procedure may relate to the UE 110 providing the network with information that may assist the network in selecting a new serving beam for the UE 110.

FIG. 4b shows a signaling diagram 460 between the UE 110 and the gNB 120A when the UE 110 is assigned a BFR preamble. In 462, continuing with the example provided above with regard to FIG. 4a, BFD is declared. In 464, the UE 110 may transmit one of a plurality preconfigured BFR preambles to the gNB 120A. The BFR preamble may indicate a preferred beam with which the gNB 120A may use for subsequent communications. The BFR preamble and the corresponding downlink beam are allocated to the UE 110 for beam failure management purposes. However, reference to the BFR preamble is only provided for illustrative purposes, other entities and networks may refer to a similar concept by a different name.

In 466, the gNB 120A transmits downlink control information (DCI) associated with the UE 110 on using the beam associated with the BFR preamble. Upon reception of this DCI, the UE 110 may consider the BFR procedure complete. Subsequently, beam management may be performed to further align this new downlink beam.

FIG. 4c shows a signaling diagram 470 between the UE 110 and the gNB 120A when the UE 110 is not assigned a BFR preamble. As will be demonstrated below this is a contention-based process.

In 472, the UE 110 transmits a RACH preamble to the gNB 120A associated with a candidate downlink beam. The RACH preamble is not assigned to the UE 110. Instead, it is one of a plurality of available preambles that may be used by any connected UEs.

In 474 the gNB 120A transmits a RAR to the UE 110. In 476 the UE 110 performs a scheduled transmission to the gNB 120A. The transmission may include various different types of information associated with the identity of the UE 110.

In 478, the gNB 120A transmits a contention resolution message to the UE 110. The contention resolution message may include a contention resolution indication. In this example, the contention resolution indication may be a dedicated uplink grant for a new transmission as indicated in a DCI via the cell radio network temporary identifier (C-RNTI). For instance, as mentioned above, more than one UE may utilize the same RACH preamble. If the UE 110 receives the dedicated uplink grant, communications between the UE 110 and the gNB 120A may proceed. However, if a different UE receives an uplink grant, the UE 110 may trigger a new RACH preamble transmission and repeat 472-478.

The examples illustrated in FIGS. 4a-4c are only provided as a general example of how the UE 110 may perform BFD and BFR procedures when the UE 110 is operating in the in-sync state. However, the exemplary embodiments are not limited to an uplink in-sync UE 110 performing BFD or BFR procedures in the manner described above. The exemplary embodiments may apply to an uplink in-sync UE 110 performing BFD and BFR in any appropriate manner.

Figure 5:
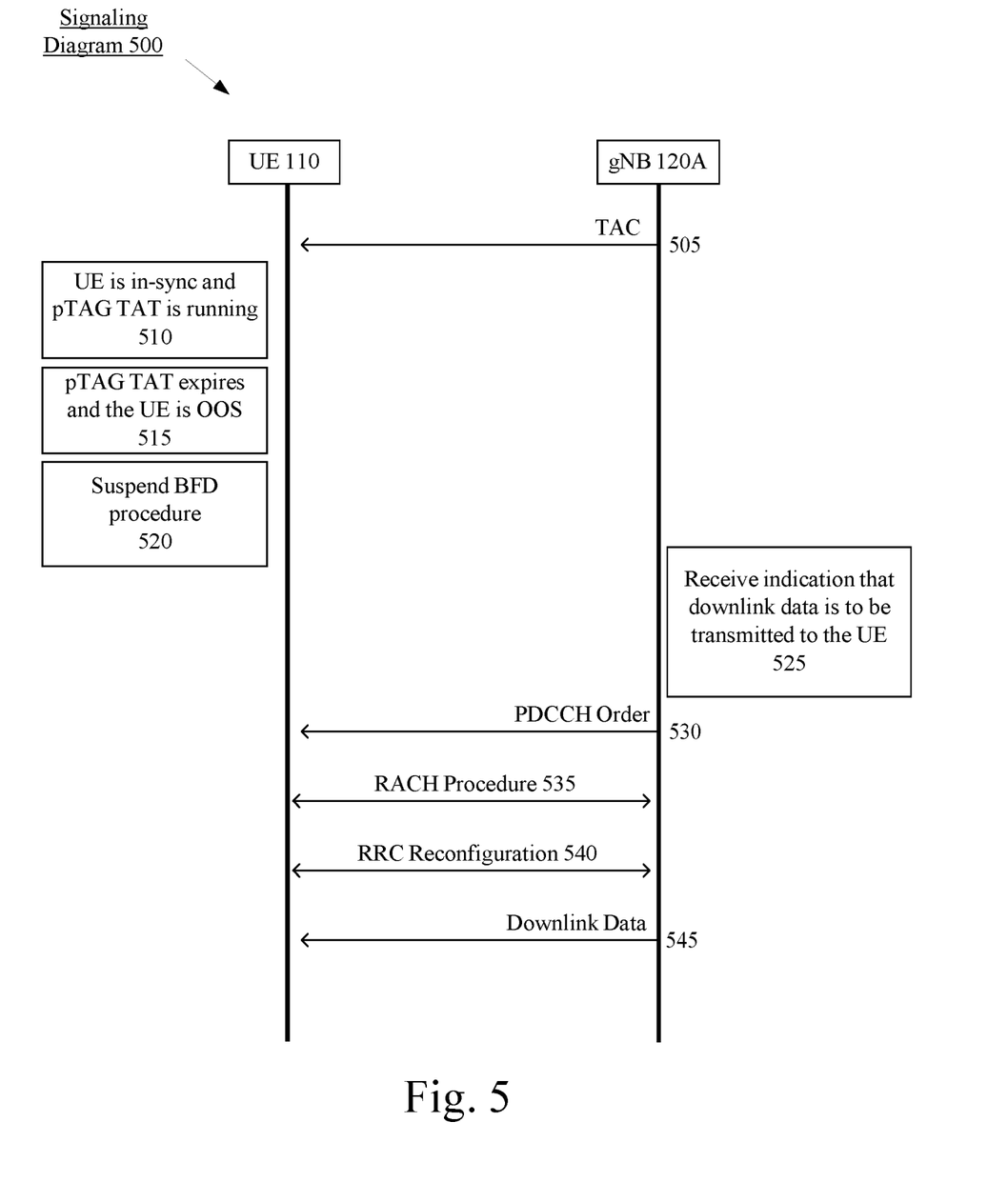
FIG. 5 shows a signaling diagram for implementing an uplink OOS beam failure management technique according to various exemplary embodiments.

FIG. 5 shows a signaling diagram 500 for implementing an uplink OOS beam failure management technique according to various exemplary embodiments. The signaling diagram 500 will be described with regard to the network arrangement 100 of FIG. 1 and the UE 110 of FIG. 2.

The signaling diagram 500 relates to suspending the BFD procedure while the UE 110 is in the OOS state. This example is described with regard to a timing advance group (TAG), specifically a primary TAG (pTAG) and a secondary TAG (sTAG). However, reference to a TAG, a pTAG and a sTAG are merely provided for illustrative purposes, different networks and entities may refer to similar concepts by different names.

The UE 110 may be configured with carrier aggregation functionality and thus, may communicate with multiple serving cells using multiple component carriers (CCs). The multiple serving cells may be grouped together into multiple TAGs. Each TAG may include one or more serving cells and for each serving cell within a TAG may correspond to the same TA. The pTAG represents a TAG that includes a primary serving cell and the sTAG represents a TAG that includes a secondary serving cell. From the UE 110 perspective, each TAG may correspond to a TAT. Thus, the UE 110 may operate more than one TAT simultaneously.

In 505, the UE 110 receives a TAC from the gNB 120A. In this example, the gNB 120A is the primary serving cell and thus, is included within the pTAG.

In 510, the UE 110 is operating in the in-sync state and the pTAG TAT is running. In 515, the pTAG TAT expires and thus, the UE 110 transitions to the OOS state.

In 520, the UE 110 suspends BFD procedures corresponding to all serving cells (e.g., cells in both the pTAG and the sTAG) based on the OOS state. Suspending the BFD procedure may be implemented in a variety of different ways. For example, with regard to the BFD procedure shown in FIG. 4a, the MAC layer 402 may omit monitoring BFR evaluation instances 410-424, the PHY layer 404 may omit performing measurements and/or collecting measurement data corresponding to serving beams, the PHY layer 404 may omit sending BFI indications (e.g., 450-458) to the MAC layer 404, the MAC layer may omit increasing the BFD counter and/or operating the BFD timer, the MAC layer 404 may alter the BFD counter threshold and/or the BFD timer duration, etc.

By suspending the BFD procedure, the UE 110 may avoid declaring a BFD and thus, triggering the BFR procedure. As a result, when the UE 110 is OOS, the UE 110 may avoid the power cost associated with these operations (e.g., collecting measurement data, communications between the PHY layer 404 and the MAC layer 402, maintaining the BFD counter, maintaining the BFD timer, processing this data, transmitting information and/or data to the gNB 120A, etc.)

Further, the UE 110 may also release BFD configuration resources and any previously allocated uplink resources when the BFD procedure is suspended. This example is described with regard to suspending the BFD procedure, however, the UE 110 may also suspend the BFR procedure. Thus, in some embodiments, the UE 110 may also release BFR configuration resources. Accordingly, the signaling diagram 500 is applicable to scenarios in which just the BFD procedure is suspended or both BFD and BFR procedures are suspended.

Returning to the signaling diagram 500, in 525, the gNB 120A receives an indication that downlink data is to be transmitted to the UE 110. Prior to transmitting the data, the gNB 120A may initiate a mechanism to trigger the UE 110 to re-enter the in-sync state. As will be demonstrated below, this example is described with regard to this mechanism being a PDCCH order. However, the exemplary embodiments are not limited to any particular mechanism and the exemplary embodiments may apply to either the UE 110 or the network triggering the UE 110 to re-enter the in-sync state using any appropriate mechanism.

In 530, the gNB 120A transmits a PDCCH order to the UE 110 to request the UE 110 to initiate a RACH procedure. The PDCCH order may be represented by a DCI included in a MAC CE.

In 535, the UE 110 and the gNB 120A participate in a signaling exchange for the RACH procedure. Subsequently, the UE 110 re-enters the in-sync state with regard to at least the pTAG (e.g., gNB 120A).

In 540, the UE 110 and the gNB 120A participate in a signaling exchange for radio resource control (RRC) reconfiguration. During this signaling exchange the network reconfigures the UE 110 BFD procedure and the BFR procedure (if applicable). In 545, the gNB 120A transmits downlink data to the UE 110.

The signaling exchange was described with regard to the pTAG TAT expiring. Since the pTAG includes the primary serving cell, when the pTAG TAT expires, the UE 110 is OOS with regard to all serving cells because the primary serving cell is how the UE 110 communicates with the network. However, there may be scenarios where the sTAG TAT expires but the pTAG TAT is still running. In this type of scenario, the UE 110 does not suspend the BFD procedures on all serving cells because the UE 110 is still in-sync with regard to the primary serving cell and thus, is still able to communicate with the network.

Figure 6:
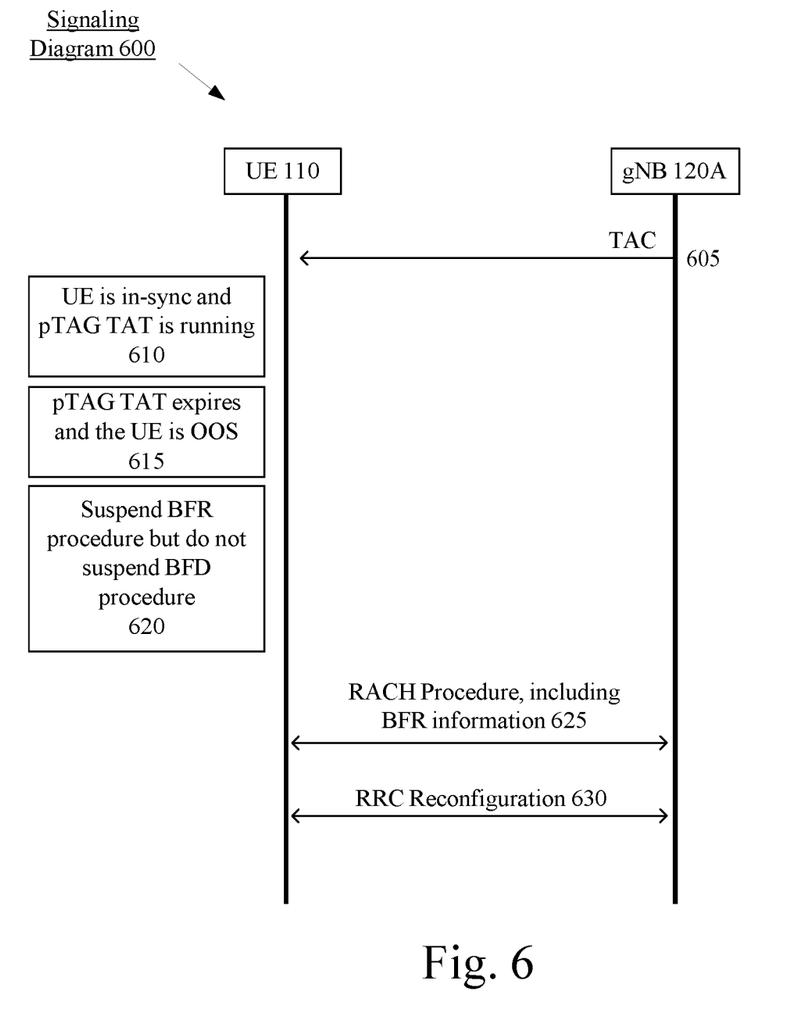
FIG. 6 shows a signaling diagram for implementing an uplink OOS beam failure management technique according to various exemplary embodiments.

FIG. 6 shows a signaling diagram 600 for implementing an uplink OOS beam failure management technique according to various exemplary embodiments. The signaling diagram 600 will be described with regard to the network arrangement 100 of FIG. 1 and the UE 110 of FIG. 2.

The signaling diagram 600 relates to suspending BFR procedures but not suspending BFD procedures. As will be described below, this allows the UE 110 to collect BFR information while the UE 110 is in the OOS state and report the BFR information after the UE 110 re-enters the in-sync state. This may improve the quality and/or performance of subsequent downlink communications.

In 605, the UE 110 receives a TAC from the gNB 120A. In this example, the gNB 120A is the primary serving cell and thus, is included within the pTAG. In 610, the UE 110 is operating in the in-sync state and the pTAG TAT is running. In 615, the pTAG TAT expires and thus, the UE 110 transitions to the OOS state. 605-615 are substantially similar to 505-515 of the signaling diagram 500 of FIG. 5.

In 620, the UE 110 suspends the BFR procedure but does not suspend the BFD procedure. Accordingly, the UE 110 may still perform the BFD procedure described above with regard to FIG. 4*a*. Conventionally, if a BFD is declared, a BFR procedure would be triggered. In this example, if a BFD is declared the BFR procedure is not initiated. Thus, the UE 110 is able to avoid the power cost associated with BFR procedures when the UE 110 is in the OOS state.

Instead of performing a BFR procedure, the UE 110 collects indications that the BFR would have been triggered and saves BFR information to report to the network when the UE 110 re-enters the in-sync state. Like in the signaling diagram 500, suspending the BFR procedure may include releasing BFR configuration information and any previously allocated uplink resources when the BFD procedure is suspended.

In 625, the UE 110 and the gNB 120A participate in a signaling exchange for the RACH procedure. Subsequently, the UE 110 re-enters the in-sync state with regard to at least the pTAG (e.g., gNB 120A). During this RACH procedure, the UE 110 may send BFR information to the gNB 120A.

The BFR information may include, but is not limited to, an indication as to which serving cell (e.g., primary cell or secondary cell) is associated with BFD during the OOS state, measurement data corresponding to a serving cell associated with BFD during the OOS state, etc. The BFR information may be used by the network to select, modify or tune a downlink serving beam that may be used for subsequent communications.

In 630, the UE 110 and the gNB 120A participate in a signaling exchange for radio resource control (RRC) reconfiguration. During this signaling exchange the network reconfigures the UE 110 BFD procedure and the BFR procedure.

Figure 7A:
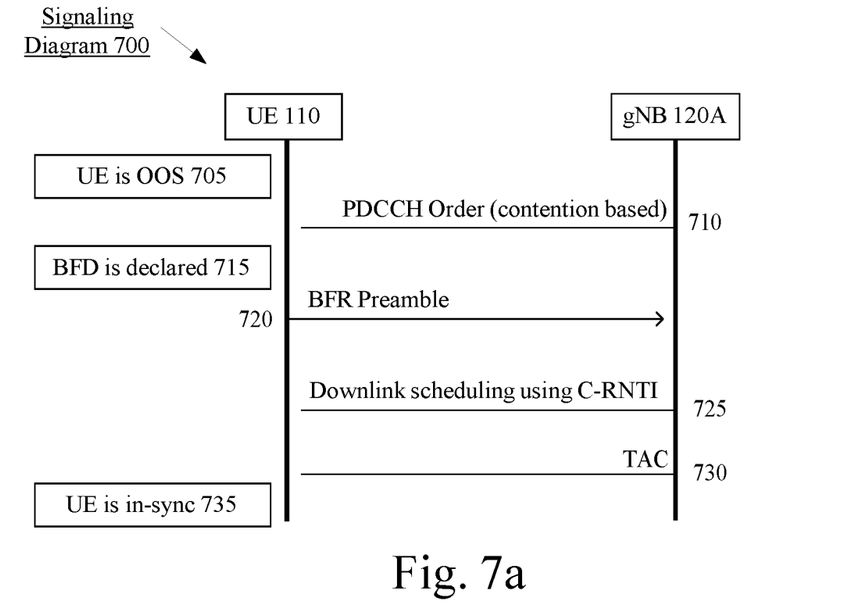
FIGS. 7a-7b show signaling diagrams for implementing an uplink OOS beam failure management technique according to various exemplary embodiments.
Figure 7B:
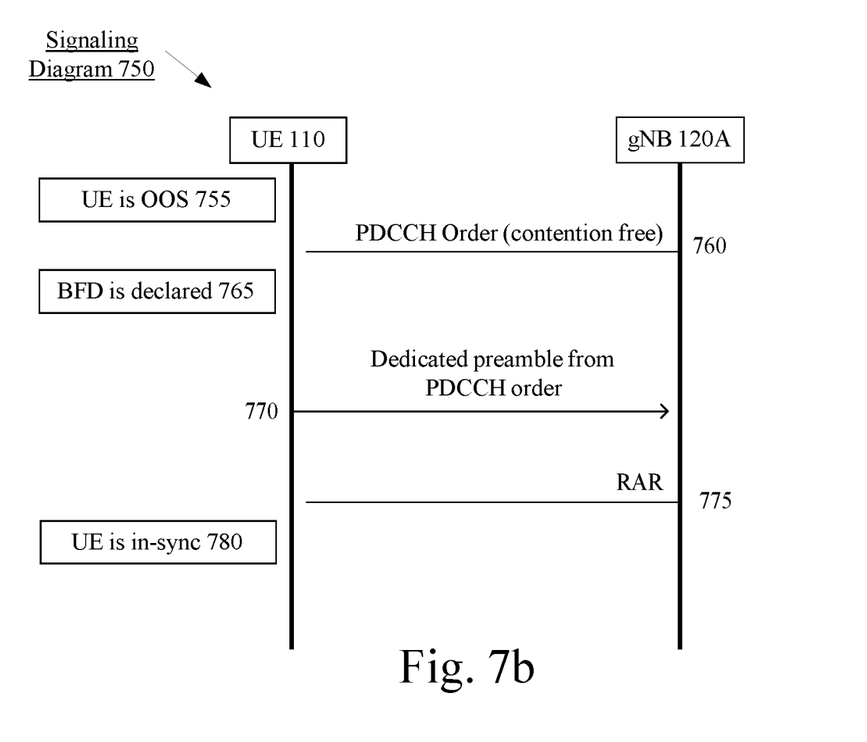

FIGS. 7*a*-7*b* relate to UE 110 operation when the BFR procedure and data triggered RA procedure collide while the UE 110 is in the OOS state. This type of scenario relates to when the network triggers the UE 110 to transition from the OOS state to the in-sync state and a BFD is also declared. The exemplary embodiments relate to prioritizing contention free RA over contention-based RA.

If the UE 110 is configured with a dedicated BFR preamble, this allows the UE 110 to perform contention free RA. Thus, if the UE 110 is configured with a dedicated BFR resource and the data triggered RA is contention-based, UE 110 may utilize the BFR preamble. If the UE 110 is not associated with a dedicated BFR resource and the data triggered RA is contention free, the UE 110 performs the data triggered RA procedure. If the both procedures are contention-based or both procedures are contention free, the UE 110 may perform either RA procedure.

FIG. 7*a* illustrates a signaling diagram 700 in which the UE 110 is allocated a BFR preamble and the data triggered RA procedure is contention-based.

In 705, the UE 110 is OOS. In 710, the gNB 120A transmits a PDCCH order to the UE 110. The PDCCH order is configured to trigger the UE 110 to initiate a contention-based RA procedure. In 715, BFD is declared.

In 720, the UE 110 transmits the BFR preamble to the gNB 120A. The BFR preamble is associated with a particular beam. Thus, both the UE 110 and the network are aware that subsequent communication may occur on the associated beam. Since the BFR preamble is dedicated (e.g., contention free) and the PDCCH order is associated with a contention-based RA procedure, the UE 110 utilize the BFR preamble.

In 725, the gNB 120A may initiate downlink scheduling using the C-RNTI in accordance with the BFR dedicated preamble mechanism.

In 730, the gNB 120A may transmit a TAC to the UE 110. In 735, the UE 110 may transition to an in-sync state based on receiving the TAC in 730.

FIG. 7*b* illustrates a signaling diagram 750 in which the UE 110 is not allocated a BFR preamble and the data triggered RA procedure is contention free.

In 755, the UE 110 is OOS. In 760, the gNB 120A transmits a PDCCH order to the UE 110. The PDCCH order is configured to trigger the UE 110 to initiate a contention free RA procedure. In 765, a BFD is declared.

In 770, the UE 110 transmits the dedicated preamble indicated in the PDCCH order to the gNB 120A. Like the BFR preamble, the dedicated preamble is associated with a particular beam. Thus, both the UE 110 and the network are aware that subsequent communication may occur on the associated beam. Since the UE 110 is not associated with a BFR preamble and the PDCCH order is associated with a contention free RA procedure, the UE 110 utilize the BFR preamble.

In 775, the gNB 120A may transmit a RAR to the UE 110. The RAR may include a TAC and thus, in 780, the UE 110 may transition to the in-sync state based on receiving the RAR.

As mentioned above, one exemplary uplink OOS beam failure management technique may relate to monitoring the PDCCH while the UE 110 is in the OOS state. In some exemplary embodiments, when the UE 110 is operating in the OOS state, the UE 110 may monitor the PDCCH in CORSET #0 for potential PDCCH scheduling and PDCCH order. In other exemplary embodiments, when the UE 110 is operating in the OOS state and uses a dedicated BFR preamble for an RA procedure, the UE 110 may monitor the DCI scheduling with C-RNTI using the dedicated search space or in CORSET #0.

Another exemplary technique relates to the UE 110 being triggered by a data arrival to perform RA procedure while the UE 110 is in the OOS state. In some embodiments, when the UE 110 is operating in the OOS state and is allocated a dedicated BFR preamble, the UE 110 may use the dedicated BFR preamble for this data driven RA procedure (even when the UE 110 BFD is not declared and BFR is not triggered). On the network side, the dedicated BFR preamble may indicate that the UE 110 is in the OOS state. This may trigger the network to provide the UE 110 with dedicated scheduling information and a TAC to cause the UE 110 to re-enter the in-sync state.

From the network perspective, when the gNB 120A receives the dedicated BFR preamble from the OOS UE 110, the network may identify that the RA procedure is for uplink synchronization. In response, the gNB 120A may provide the corresponding DCI in the CORSET #0 or in the BFR specific search space to complete the RACH procedure.

In some embodiments, when the network triggers the PDCCH order, the select the BFR dedicated preamble for the RA procedure. Thus, the PDCCH order may indicate to the UE 110 that the UE 110 is to use the dedicated BFR preamble to perform RA in response to the PDCCH order.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE):
   receiving a timing advance command (TAC) from a currently camped cell;
   initiating a time advance timer (TAT), wherein when the TAT is running the UE is in a first operating state, wherein the first operating state indicates that the UE is in time alignment with the cell;
   identifying that the TAT has expired, wherein when the TAT is not running the UE is in a second operating state, wherein the second operating state indicates that the UE is not in time alignment with the cell; and
   implementing, during the second operating state, one or more beam failure management techniques, wherein the one or more beam failure management techniques includes suspending a beam failure recovery (BFR) procedure without suspending a beam failure detection (BFD) procedure;
   identifying, during the second operating state, a predetermined condition indicating that BFD is to be declared, wherein the BFR procedure is not initiated in response to the predetermined condition based on suspending the BFR procedure; and
   transmitting to the cell information corresponding to the predetermined condition indicating that BFD is to be declared during a random access channel (RACH) procedure.

2. The method of claim 1, further comprising:
   receiving a further TAC when the UE is in the second operating state;
   initiating the TAT based on the further TAC, wherein the UE transitions from the second operating state to the first operating state based on initiating the TAT and wherein the UE does not utilize the one or more beam failure management techniques when the UE is operating in the first operating state.

3. The method of claim 1, wherein suspending the BFR procedure including releasing BFR configuration resources.

4. The method of claim 1, wherein the one or more beam failure management techniques further includes selecting between a first random access (RA) procedure and a second RA procedure, the first RA procedure corresponding to utilizing a beam failure recovery (BFR) preamble and the second RA procedure corresponding to i) utilizing information included in a physical downlink control channel (PDCCH) order or ii) utilizing information selected by the UE.

5. The method of claim 4, wherein the first RA procedure is selected when the BFR preamble is dedicated and the second RA procedure is a contention-based RA.

6. The method of claim 4, wherein the second RA is selected when the BFR preamble is not dedicated and the PDCCH order indicates a contention free RA.

7. The method of claim 1, wherein the one or more beam failure management techniques further includes transmitting a dedicated beam failure recovery (BFR) preamble to the cell when the UE is triggered to perform a random access (RA) procedure to transition from the second operating state to the first operating state.

8. A user equipment (UE), comprising:
   a transceiver configured to establish a network connection; and
   a processor configured to perform operations, the operations comprising:
   receiving a timing advance command (TAC) from a currently camped cell;

initiating a time advance timer (TAT), wherein when the TAT is running the UE is in a first operating state, wherein the first operating state indicates that the UE is in time alignment with the cell;

identifying that the TAT has expired, wherein when the TAT is not running the UE is in a second operating state, wherein the second operating state indicates that the UE is not in time alignment with the cell; and implementing, during the second operating state, one or more beam failure management techniques, wherein the one or more beam failure management techniques includes suspending a beam failure recovery (BFR) procedure without suspending a beam failure detection (BFD) procedure;

identifying, during the second operating state, a predetermined condition indicating that BFD is to be declared, wherein the BFR procedure is not initiated in response to the predetermined condition based on suspending the BFR procedure; and transmitting to the cell information corresponding to the predetermined condition indicating that BFD is to be declared during a random access channel (RACH) procedure.

9. The UE of claim 8, the operations further comprising:

receiving a further TAC when the UE is in the second operating state;

initiating the TAT based on the further TAC, wherein the UE transitions from the second operating state to the first operating state based on initiating the TAT and wherein the UE does not utilize the one or more beam failure management techniques when the UE is operating in the first operating state.

10. The UE of claim 8, wherein the one or more beam failure management techniques further includes selecting between a first random access (RA) procedure and a second RA procedure, the first RA procedure corresponding to utilizing a beam failure recovery (BFR) preamble and the second RA procedure corresponding to i) utilizing information included in a physical downlink control channel (PDCCH) order or ii) utilizing information selected by the UE.

11. The UE of claim 10, wherein the first RA procedure is selected when the BFR preamble is dedicated and the second RA procedure indicates a contention-based RA.

12. The UE of claim 10, wherein the second RA is selected when the BFR preamble is not dedicated and the PDCCH order indicates a contention free RA.

13. An integrated circuit, comprising:

circuitry configured to receive a timing advance command (TAC) from a cell of a network;

circuitry configured to initiate a time advance timer (TAT), wherein when the TAT is running a user equipment is operating in a first operating state, wherein the first operating state indicates that the UE is in time alignment with the cell;

circuitry configured to identify that the TAT has expired, wherein when the TAT is not running the UE is operating in a second operating state, wherein the second operating state indicates that the UE is not in time alignment with the cell; and circuitry configured to implement, during the second operating state, one or more beam failure management techniques, wherein the one or more beam failure management techniques includes suspending a beam failure recovery (BFR) procedure without suspending a beam failure detection (BFD) procedure;

identifying, during the second operating state, a predetermined condition indicating that BFD is to be declared, wherein the BFR procedure is not initiated in response to the predetermined condition based on suspending the BFR procedure; and transmitting to the cell information corresponding to the predetermined condition indicating that BFD is to be declared during a random access channel (RACH) procedure.

14. The integrated circuit of claim 13, the operations further comprising:

circuitry configured to receive a further TAC when the UE is in the second operating state;

circuitry configured to initiate the TAT based on the further TAC, wherein the UE transitions from the second operating state to the first operating state based on initiating the TAT and wherein the UE does not utilize the one or more beam failure management techniques when the UE is operating in the first operating state.

15. The integrated circuit of claim 13, wherein the one or more beam failure management techniques includes selecting between a first random access (RA) procedure and a second RA procedure, the first RA procedure corresponding to utilizing a beam failure recovery (BFR) preamble and the second RA procedure corresponding to i) utilizing information included in a physical downlink control channel (PDCCH) order or ii) utilizing information selected by the UE.

16. The integrated circuit of claim 15 wherein the first RA procedure is selected when the BFR preamble is dedicated and the second RA procedure is a contention-based RA.

17. The integrated circuit of claim 16, wherein the second RA is selected when the BFR preamble is not dedicated and the PDCCH order indicates a contention free RA.

* * * * *